(12) United States Patent
Smith et al.

(10) Patent No.: US 12,594,816 B2
(45) Date of Patent: Apr. 7, 2026

(54) SYSTEM FOR A VEHICLE

(71) Applicant: Ford Global Technologies, LLC,
Dearborn, MI (US)

(72) Inventors: George David Koch Smith, Lake
Orion, MI (US); **Demetrius Conell
Johnson-Gault**, Ferndale, MI (US);
Terry Wayne Vandenbrink, Carleton,
MI (US); Stuart C. Salter, White Lake,
MI (US); **Christopher Stephen Van
auken**, Canton, MI (US)

(73) Assignee: Ford Global Technologies, LLC,
Dearborn, MI (US)

( * ) Notice: Subject to any disclaimer, the term of this
patent is extended or adjusted under 35
U.S.C. 154(b) by 149 days.

(21) Appl. No.: 18/446,161

(22) Filed: Aug. 8, 2023

(65) Prior Publication Data

US 2025/0050706 A1      Feb. 13, 2025

(51) Int. Cl.
*B60H 1/00*          (2006.01)
(52) U.S. Cl.
CPC ..... *B60H 1/00985* (2013.01); *B60H 1/00871*
(2013.01)
(58) Field of Classification Search
CPC ............ B60H 1/00828; B60H 1/00871; B60H
1/00985; B60H 2001/00185; B60H
2001/00192; B60H 2001/002; B60H
1/0075
See application file for complete search history.

(56) References Cited

U.S. PATENT DOCUMENTS

| | | | | |
|---|---|---|---|---|
| 6,012,297 | A * | 1/2000 | Ichishi ............... | B60H 1/00871 |
| | | | | 165/203 |
| 11,091,009 | B2 | 8/2021 | Skapof et al. | |
| 2020/0094014 | A1* | 3/2020 | Kakizaki ........... | B60H 1/00871 |
| 2020/0384831 | A1 | 12/2020 | Stoia et al. | |
| 2021/0334551 | A1* | 10/2021 | Ando .................... | G06T 7/0002 |
| 2022/0032731 | A1 | 2/2022 | Skapof et al. | |

(Continued)

FOREIGN PATENT DOCUMENTS

DE       102009011710 A1      9/2010

OTHER PUBLICATIONS

"Rivian R1T User Interface—Complete In-Depth Guide," https://
www.youtube.com/watch?v=2eT9ZoG8Z7M&t=154s, downloaded
May 18, 2023, 16 pages.

*Primary Examiner* — Marc E Norman
(74) *Attorney, Agent, or Firm* — Vichit Chea; Price
Heneveld LLP

(57)          ABSTRACT
A system for a vehicle includes an air conditioning system,
a motorized directional air flow control feature, a display,
and a controller configured to initiate a variable air flow
routine. Initiation of the variable air flow routine prompts
execution of a predetermined actuation sequence of the
motorized directional air flow control feature such that the
direction of air flowing from the air conditioning system into
a cabin of the vehicle is varied sequentially by the motorized
directional air flow control feature. Initiation of the variable
air flow routine further prompts the display to display an air
flow graphic having a directional quality that corresponds
with the orientation of the motorized directional air flow
control feature such that the directional quality of the air
flow graphic varies sequentially with the direction of the air
flowing from the air conditioning system.

13 Claims, 8 Drawing Sheets

(56) References Cited

U.S. PATENT DOCUMENTS

| 2022/0128466 | A1* | 4/2022 | Surnilla | G06N 20/00 |
| 2022/0185074 | A1 | 6/2022 | Iniguez et al. | |
| 2022/0258565 | A1 | 8/2022 | Skapof | |
| 2023/0176726 | A1 | 6/2023 | Kim et al. | |
| 2024/0208294 | A1* | 6/2024 | Jierian | B60H 1/00742 |
| 2024/0359528 | A1* | 10/2024 | Sasanuma | B60K 35/10 |
| 2024/0370154 | A1* | 11/2024 | Sasanuma | G06F 3/04847 |

* cited by examiner

22

START

200 — Execute predetermined actuation sequence

202 — Display air flow graphic with correspondingly varying directional quality

204 — Input terminating routine received ?

Yes

No

206 — Predetermined duration of actuation sequence met ?

No

Yes

END

300

310 Receiving Input

320 Performing Predetermined Actuation Sequence

330 Displaying Air Flow Graphic

SYSTEM FOR A VEHICLE

FIELD OF THE DISCLOSURE

The present invention generally relates to a system for a vehicle. More specifically, the present disclosure relates to a system for a vehicle that includes an air conditioning system and a motorized directional air flow control feature.

BACKGROUND OF THE DISCLOSURE

Vehicles typically include air conditioning systems. A system that controls the direction of air flowing into the vehicle and displays a representation of the air flowing into the vehicle may be desired.

SUMMARY OF THE DISCLOSURE

According to a first aspect of the present disclosure, a system for a vehicle includes an air conditioning system, a motorized directional air flow control feature, a display, and a controller configured to initiate a variable air flow routine. Initiation of the variable air flow routine prompts execution of a predetermined actuation sequence of the motorized directional air flow control feature such that the direction of conditioned air flowing from the air conditioning system into a cabin of the vehicle is varied sequentially by the motorized directional air flow control feature. Initiation of the variable air flow routine further prompts the display to display an air flow graphic having a directional quality that corresponds with the orientation of the motorized directional air flow control feature such that the directional quality of the air flow graphic varies sequentially with the direction of the conditioned air flowing from the air conditioning system.

Embodiments of the first aspect of the present disclosure can include any one or a combination of the following features:

- initiation of the variable air flow routine prompts execution of the predetermined actuation sequence for a predetermined duration;
- the predetermined duration is greater than 10 seconds;
- the predetermined duration is greater than 30 seconds;
- execution of the predetermined actuation sequence includes actuating the motorized directional air flow control feature, such that the direction of conditioned air flowing into the cabin is modified in a first direction having a first vehicle-direction component, and subsequently actuating the motorized directional air flow control feature, such that the direction of conditioned air flowing into the cabin is modified in a second direction having a second vehicle-direction component that is opposite the first vehicle-direction component;
- the first vehicle-direction component is a first vehicle-lateral direction, and the second vehicle-direction component is a second vehicle-lateral direction that is opposite the first vehicle-lateral direction;
- the first vehicle-direction component is vehicle-upward and the second vehicle-direction component is vehicle-downward;
- an input device coupled to the controller and configured to receive a user input, wherein the controller is configured to initiate the variable air flow routine in response to the input device receiving the user input; and
- the input device is a touchscreen that comprises the display.

According to a second aspect of the present disclosure, a system for a vehicle includes an air conditioning system that conveys conditioned air into a cabin of the vehicle, a motorized directional air flow control feature that controls a direction of conditioned air flowing into the cabin of the vehicle from the air conditioning system, a touchscreen display for receiving a user input and displaying an air flow graphic having a directional quality, and a controller configured to initiate a variable air flow routine in response to receiving the user input. Initiation of the variable air flow routine prompts execution of a predetermined actuation sequence of the motorized directional air flow control feature such that the direction of conditioned air flowing from the air conditioning system into the cabin of the vehicle is varied sequentially by the motorized directional air flow control feature. Initiation of the variable air flow routine further prompts the touchscreen display to correspondingly vary the directional quality of the air flow graphic.

Embodiments of the second aspect of the present disclosure can include any one or a combination of the following features:

- the predetermined actuation sequence is executed for a duration greater than 10 seconds;
- execution of the predetermined actuation sequence includes actuating the motorized directional air flow control feature, such that the direction of conditioned air flowing into the cabin is modified in a first direction having a first vehicle-direction component, and subsequently actuating the motorized directional air flow control feature, such that the direction of conditioned air flowing into the cabin is modified in a second direction having a second vehicle-direction component that is opposite the first vehicle-direction component;
- the first vehicle-direction component is a first vehicle-lateral direction, and the second vehicle-direction component is a second vehicle-lateral direction that is opposite the first vehicle-lateral direction; and
- the first vehicle-direction component is vehicle-upward and the second vehicle-direction component is vehicle-downward.

According to a third aspect of the present disclosure, a method of operating a system of a vehicle includes the steps of performing a predetermined actuation sequence of a motorized directional air flow control feature of the vehicle, such that a direction of conditioned air flowing from an air conditioning system into a cabin of the vehicle is varied sequentially by the motorized directional air flow control feature, and displaying on a display an air flow graphic that includes a directional quality that varies sequentially to correspond with the sequentially varying direction of the conditioned air flowing from the air conditioning system into the cabin.

Embodiments of the third aspect of the present disclosure can include any one or a combination of the following features:

- the step of performing a predetermined actuation sequence includes actuating the motorized directional air flow control feature, such that the direction of conditioned air flowing into the cabin is modified in a first direction having a first vehicle-direction component, and subsequently actuating the motorized directional air flow control feature, such that the direction of conditioned air flowing into the cabin is modified in a second direction having a second vehicle-direction component that is opposite the first vehicle-direction component;

the first vehicle-direction component is a first vehicle-lateral direction, and the second vehicle-direction component is a second vehicle-lateral direction that is opposite the first vehicle-lateral direction;

the first vehicle-direction component is vehicle-upward and the second vehicle-direction component is vehicle-downward;

the step of receiving a user input on an input device that prompts performance of the predetermined actuation sequence; and the input device is a touchscreen that comprises the display.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
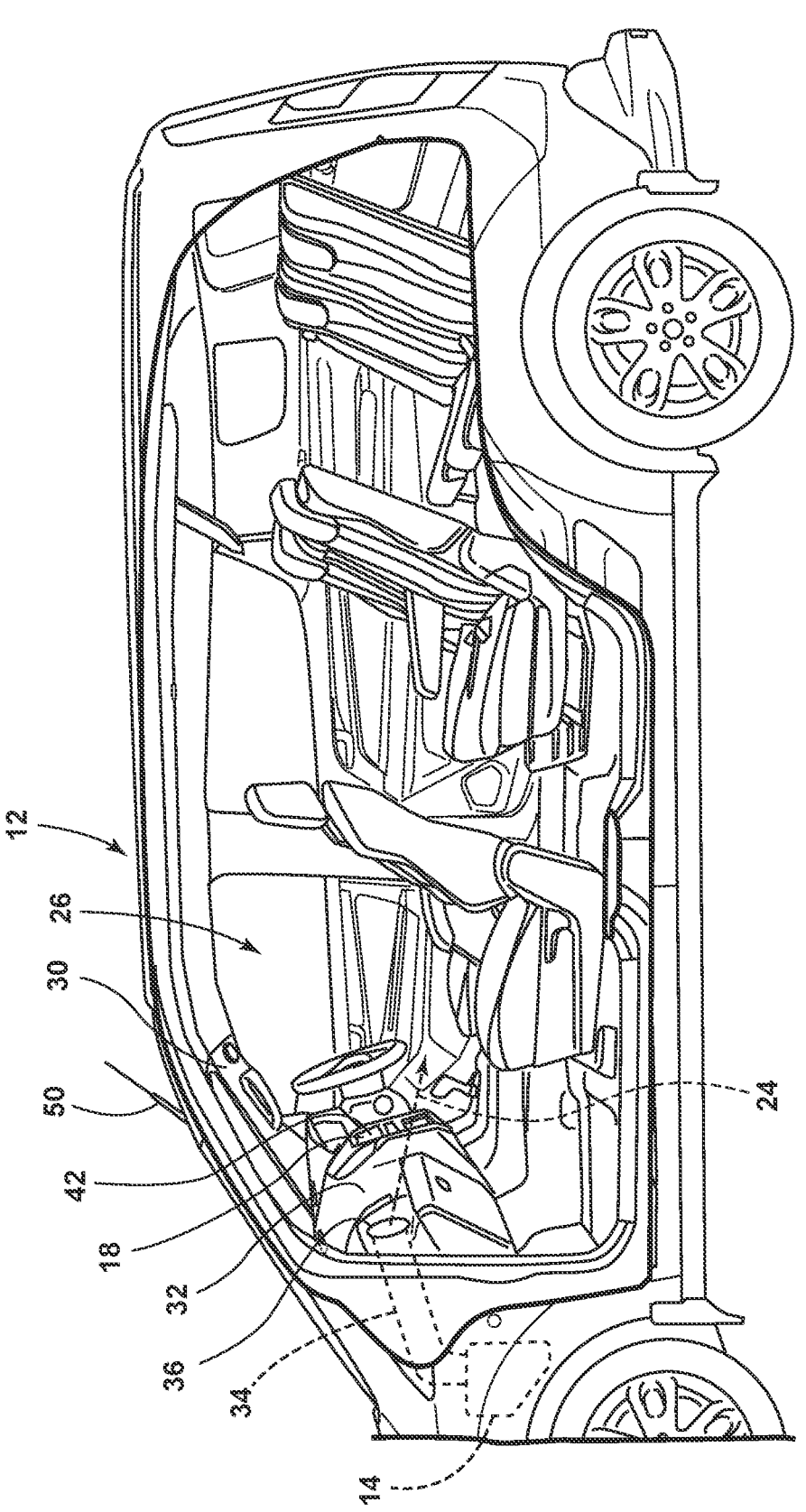
FIG. 1 is a perspective view of a vehicle illustrating a cabin of the vehicle and an air conditioning system of the vehicle, according to one embodiment.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-8, a system 10 for a vehicle 12 includes an air conditioning system 14, a motorized directional air flow control feature 16, a display 18, and a controller 20. The controller 20 is configured to initiate a variable air flow routine 22. Initiation of the variable air flow routine 22 prompts execution of a predetermined actuation sequence of the motorized directional air flow control feature 16 such that the direction of conditioned air 24 flowing from the air conditioning system 14 into a cabin 26 of the vehicle 12 is varied sequentially by the motorized directional air flow control feature 16, and the display 18 to display an air flow graphic 28 having a directional quality that corresponds with the orientation of the motorized directional air flow control feature 16 such that the directional quality of the air flow graphic 28 varies sequentially with the direction of the conditioned air 24 flowing from the air conditioning system 14.

Figure 3:
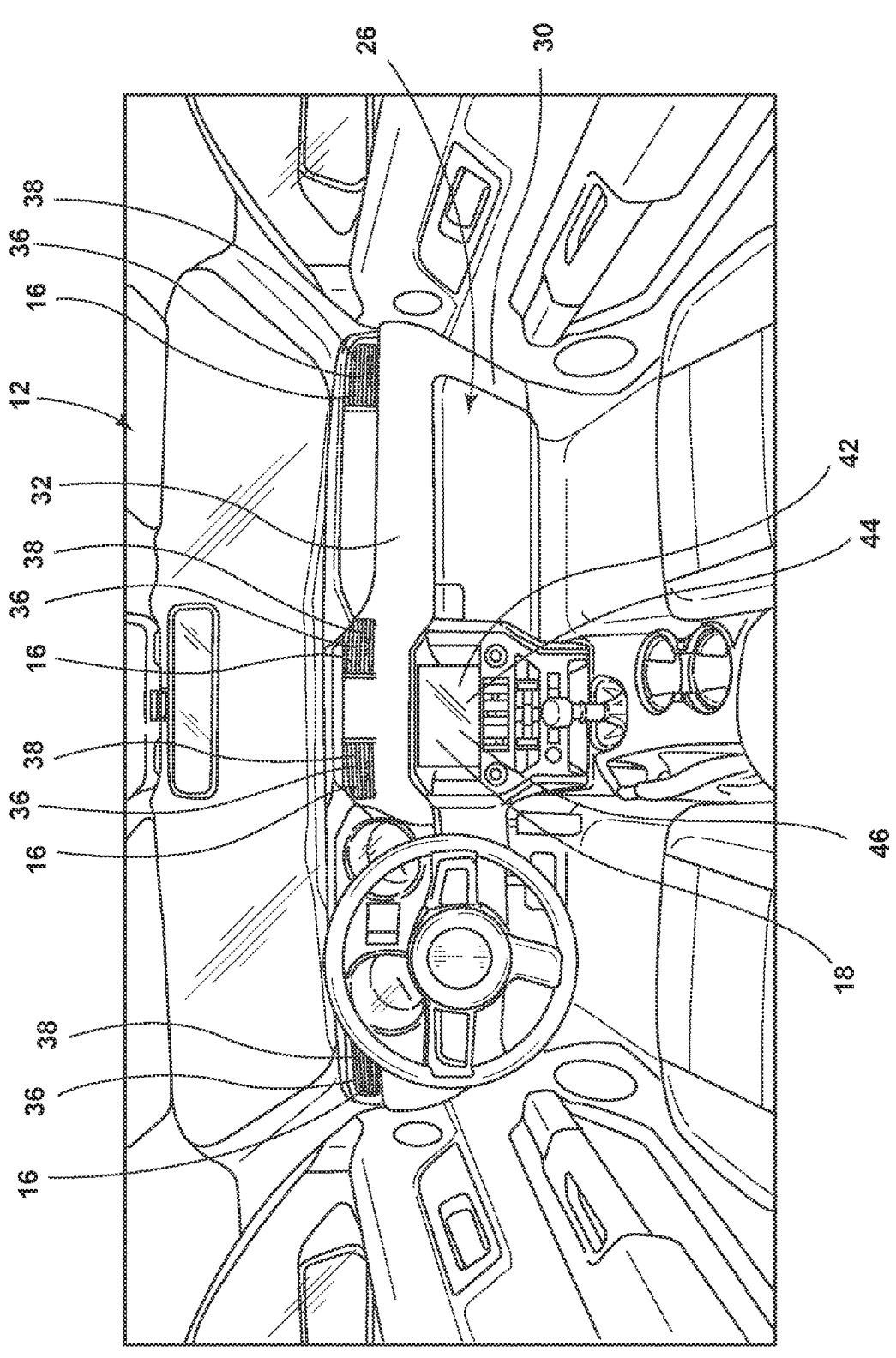
FIG. 3 is a perspective view of a vehicle interior of a vehicle, illustrating an instrument panel and a plurality of motorized directional air flow control features disposed on the instrument panel, according to one embodiment.

Referring now to FIG. 1, the vehicle 12 is shown. In various embodiments, the vehicle 12 may be any one of a variety of vehicle types (e.g., truck, sedan, SUV, bus, etc.). The vehicle 12 includes the vehicle interior 30. The vehicle interior 30 generally defines the cabin 26. Referring now to FIGS. 1 and 3, the vehicle interior 30 may include an instrument panel 32. As shown in FIG. 1, in various implementations, the instrument panel 32 may be conventionally positioned near the vehicle-forward end of the vehicle interior 30. It is contemplated that, in some embodiments, the instrument panel 32 may be positioned in various positions throughout the vehicle interior 30.

Figure 2:
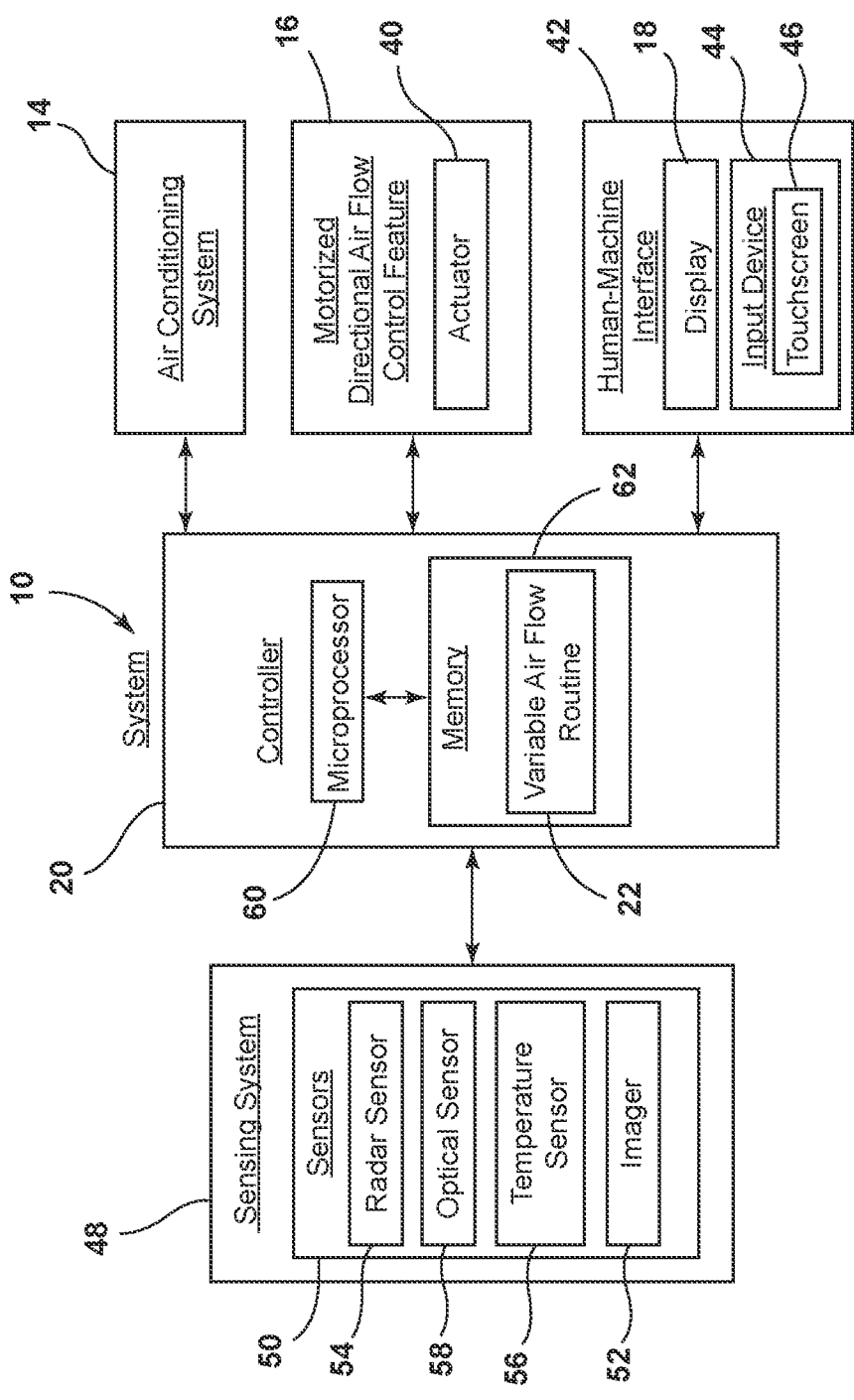
FIG. 2 is a block diagram of a system of a vehicle, according to one embodiment.

Referring now to FIGS. 1 and 2, the vehicle 12 may include the air conditioning system 14. The air conditioning system 14 is configured to convey conditioned air 24 into the cabin 26 of the vehicle 12. The air conditioning system 14 may include a heating, ventilation, and air conditioning (HVAC) unit that may include components, such as the typical components utilized in the refrigeration cycle, a filter, and an HVAC fan. However, it is contemplated that, in various embodiments, the air conditioning system 14 may be any suitable system configured to move, ventilate, heat, cool, dehumidify, clean and/or filter air. As such, it is to be understood that conditioned air 24 refers to air that has been modified by the air conditioning system 14 by at least one of movement, heating, cooling, dehumidifying, cleaning, filtering, and/or a combination thereof.

In various embodiments, the air conditioning system 14 may include one or more ducts 34 that may be configured to direct the flow of conditioned air 24 toward the cabin 26 of the vehicle 12. In various implementations, the one or more ducts 34 convey the conditioned air 24 to one or more outlets 36 through which the conditioned air 24 flows into the cabin 26 of the vehicle 12, as illustrated in FIG. 1. As illustrated in FIGS. 1 and 3, the vehicle 12 includes a plurality of outlets 36 that are positioned on the instrument panel 32 of the vehicle 12. It is contemplated that the outlets 36 may be positioned on various portions of the vehicle interior 30.

Referring now to FIGS. 2 and 3, the vehicle 12 includes the motorized directional air flow control feature 16 (i.e., control feature 16) that is configured to control a direction of conditioned air 24 flowing into the cabin 26 of the vehicle 12 from the air conditioning system 14. In various implementations, the control feature 16 is positioned proximate to and/or defines the outlet 36 through which conditioned air 24 flows from the air conditioning system 14 into the cabin 26 of the vehicle 12. In some implementations, the vehicle 12 includes a plurality of control features 16. For example, as illustrated in FIG. 3, a plurality of control features 16 are disposed on the instrument panel 32 of the vehicle interior 30. The control feature 16 may include one or more flow influencing features 38 (veins, flaps, etc.) and/or one or more actuators 40 that are configured to modify the one or more flow influencing features 38 to control a direction of the conditioned air 24 flowing into the cabin 26 of the vehicle 12 from the air conditioning system 14. In various implementations, the control feature 16 is operable to direct conditioned air 24 flowing into the cabin 26 in a plurality of vehicle-horizontal and/or vehicle-vertical directions. For example, in some embodiments, the actuation of the control feature 16 may modify the direction that conditioned air 24 flows in the vehicle 12 in any combination of a vehicle-upward direction, a vehicle-downward direction, a first vehicle-lateral direction, and a second vehicle-lateral direction that is opposite the first vehicle-lateral direction.

Referring now to FIGS. 1-6, in various embodiments, the system 10 of the vehicle 12 may include a human-machine interface 42 (HMI 42). The HMI 42 may include the display 18, such as a center-stack mounted navigation or entertainment display 18. The HMI 42 may further include an input device 44. The user input device 44 may be implemented by configuring the display 18 as a portion of a touchscreen 46 with circuitry to receive user inputs entered via user selection of an input option of the input device 44 that corresponds with a location over the display 18, wherein a visual representation of the input option may be displayed. Other forms of input devices 44, such as one or more joysticks, digital input pads, buttons, dials, or the like, may be used in place of or in addition to the touchscreen 46, in various implementations. Further, the HMI 42 may include a microphone for receiving user inputs in the form of voice commands. In some embodiments, the system 10 may communicate via wireless communication with another embodiment of the HMI 42, such as with a portable electronic device. The portable electronic device may also include the display 18 for displaying one or more images and other information to the user. The portable electronic device may be further able to receive user inputs via touchscreen 46 circuitry and/or other means. In addition, the portable electronic device may provide feedback information, such as visual, audible, and tactile alerts.

The system 10 for the vehicle 12 may include a sensing system 48. The sensing system 48 includes at least one sensor 50. In various embodiments, the sensing system 48 may include various sensors 50 and/or devices that obtain or otherwise provide information pertaining to a status of the vehicle 12 and/or various other entities, such as a user of the vehicle 12. For example, in some instances, the sensing system 48 may include one or more imagers 52 or any other vision-based device. In some implementations, the sensing system 48 may include one or more imagers 52 that are configured to capture an image of the cabin 26 of the vehicle 12. In some implementations, the sensing system 48 may include one or more imagers 52 that are configured to capture an image of the exterior environment of the vehicle 12. For example, the sensing system 48 may include one or more of a center high-mount stop light (CHMSL) imager, a rear imager, a forward imager proximate to a forward end of the vehicle 12, a left-side side-view imager, and/or a right-side side-view imager. The one or more imagers 52 may include an area-type image sensor, such as a CCD or a CMOS image sensor, and image-capturing optics that capture an image of an imaging field of view defined by the image-capturing optics.

In some instances, various imagers 52 included in the sensing system 48 may be positioned to generally overlap in their respective fields of view. In this manner, image data from two or more of the imagers 52 may be combined into a single image or image patch, via an image processing routine. In such examples, the image data may be used to derive stereoscopic image data that can be used to reconstruct a three-dimensional scene of the area or areas within overlapped areas of the various fields of view including any objects therein.

In some examples, the use of two images including the same object can be used to determine a location of the object relative to the two imagers 52, given a known spatial relationship between the imagers 52, through projective geometry of the imagers 52. In this respect, known programming and/or functionality may be utilized in an image processing routine to identify an object within the image data from the various imagers 52 within the sensing system 48. The image processing routine may include information related to the positioning of any of the imagers 52 present on the vehicle 12, including relative to a center of the vehicle 12.

Figure 4:
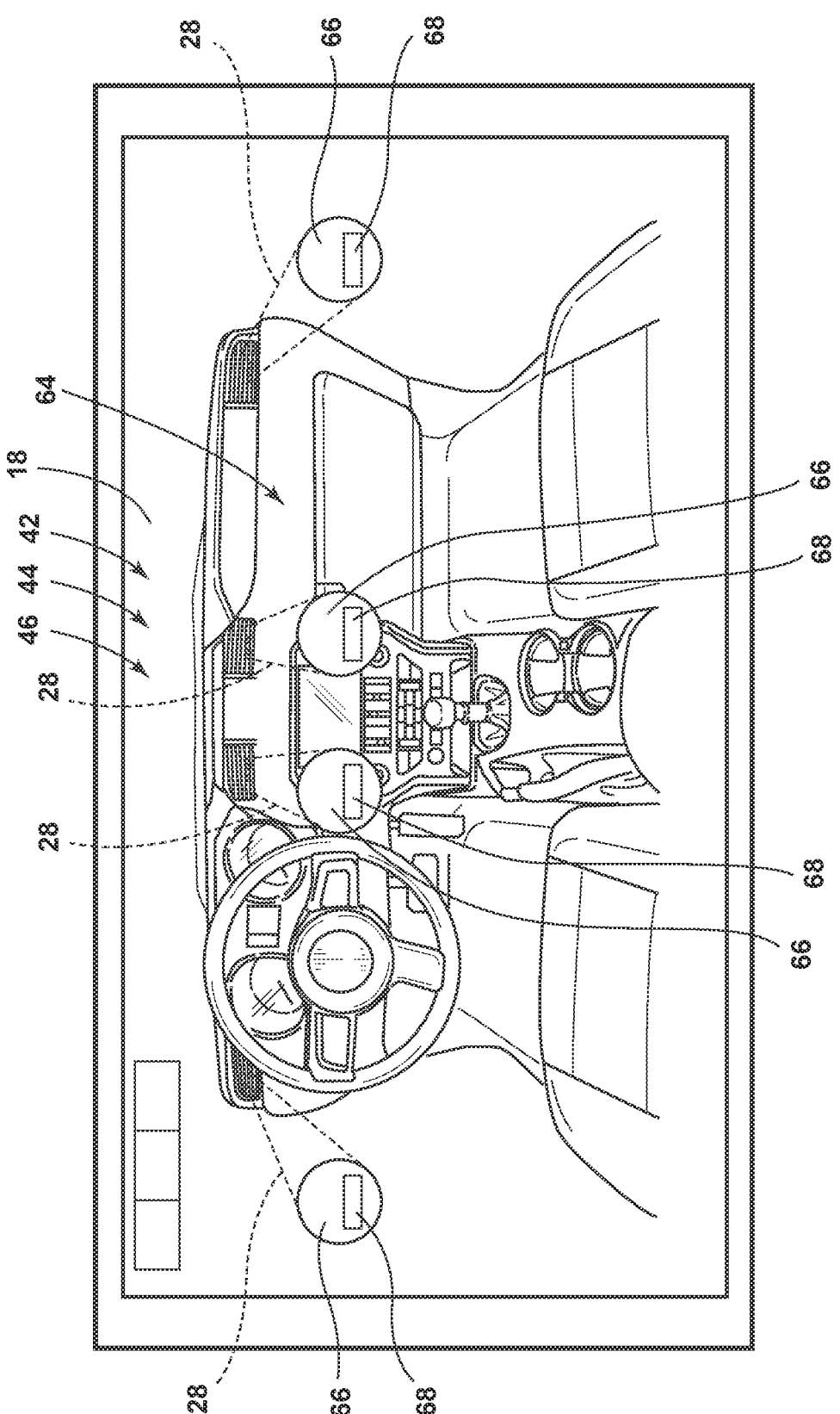
FIG. 4 is an elevational view of a touchscreen of a system of a vehicle displaying a vehicle interior graphic and an air flow graphic that represents the flow of conditioned air into a cabin of the vehicle, according to one embodiment.
Figure 5:
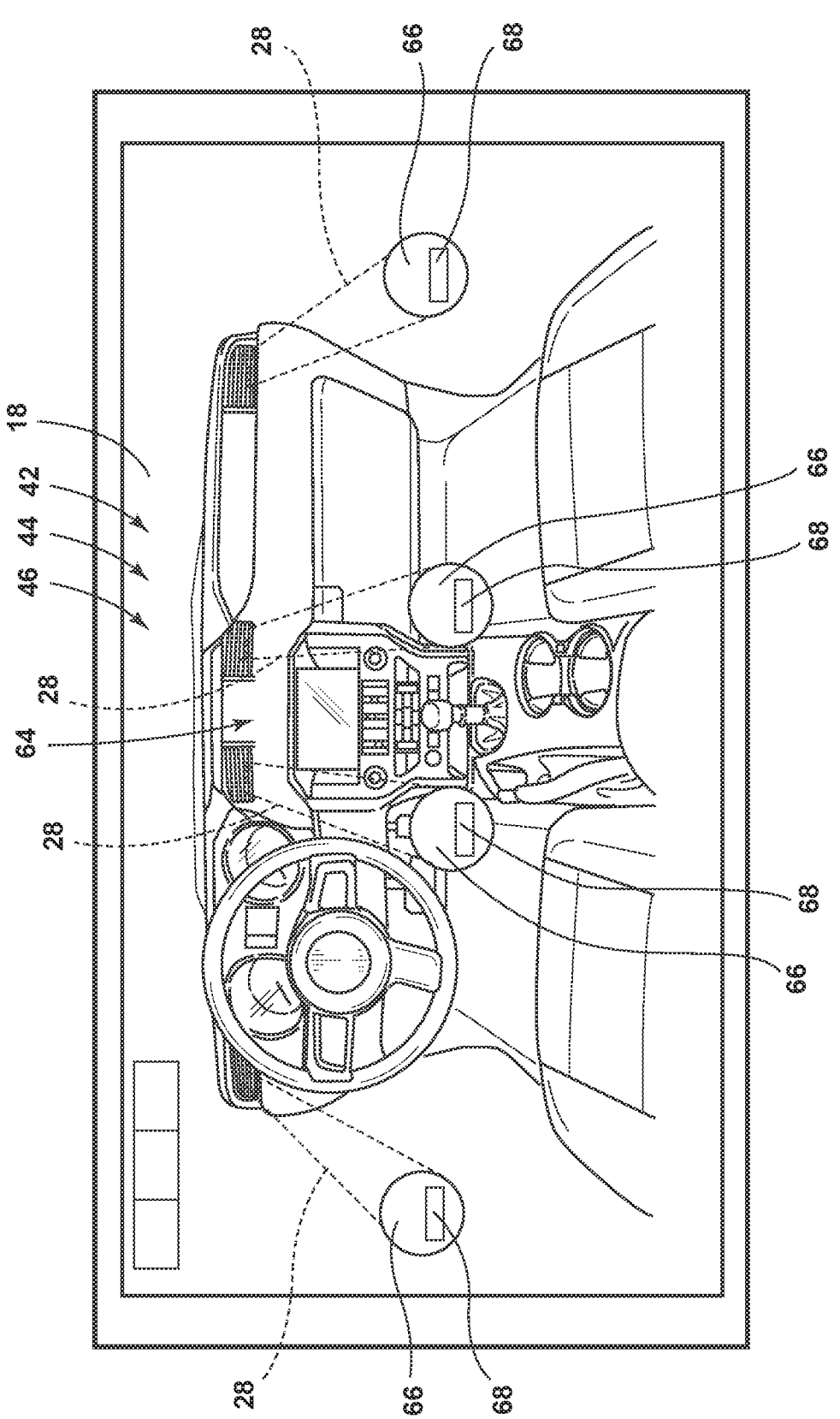
FIG. 5 is an elevational view of a touchscreen of a system of a vehicle displaying a vehicle interior graphic and an air flow graphic that represents the flow of conditioned air into a cabin of the vehicle, according to one embodiment.
Figure 6:
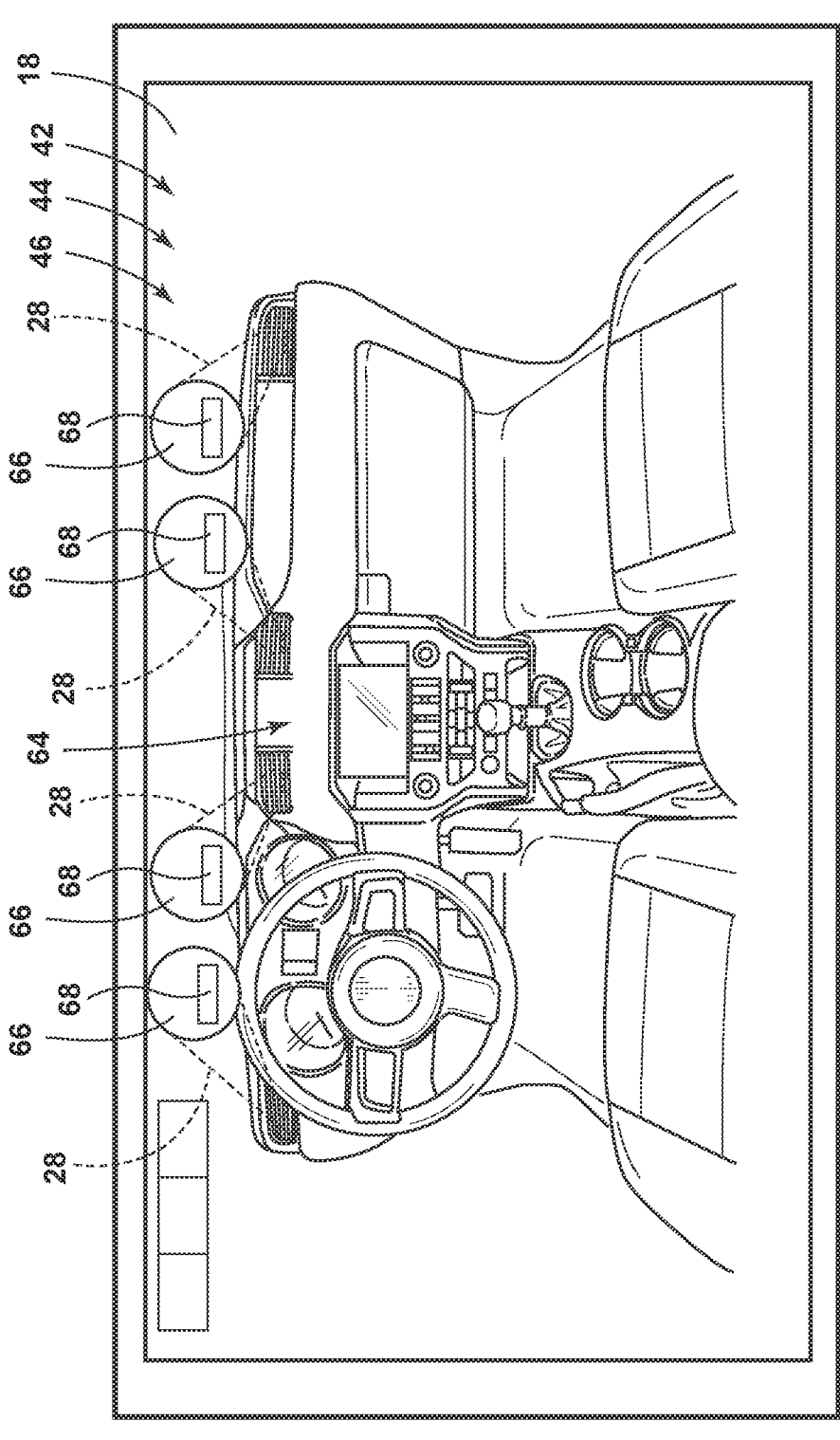
FIG. 6 is an elevational view of a touchscreen of a system of a vehicle displaying a vehicle interior graphic and an air flow graphic that represents the flow of conditioned air into a cabin of the vehicle, according to one embodiment.

Referring still to FIGS. 2 and 4, the sensing system 48 may include at least one of a host of types of sensors 50 operable to sense a proximity and/or position of one or more objects within the cabin 26 and/or in the exterior environment of the vehicle 12. For example, in various embodiments, the sensing system 48 may include, but is not limited to, one or more of an ultrasonic sensor, a radio detection and ranging (radar) sensor, a sound navigation and ranging (SONAR) sensor, a light detection and ranging (LIDAR) sensor, a vision-based sensor, and/or any other type of sensor known in the art.

In various embodiments, the sensing system 48 includes at least one radar sensor 54. In some embodiments, the at least radar sensor 54 may include a plurality of radar sensors 54 that cooperate to provide imaging radar. For example, four radar sensors 54 (e.g., Texas Instruments AWR6843 Single Chip 60-GHz to 64-GHz automotive radar sensor) may be incorporated into a single printed circuit board, and the data collected by the four radar sensors 54 may be utilized to produce imaging radar.

In various embodiments, the sensing system 48 may include one or more temperature sensors 56. The one or more temperature sensors 56 may be operable to detect a temperature within the cabin 26 of the vehicle 12 and/or a temperature in the exterior environment of the vehicle 12. For example, the sensing system 48 may include a temperature sensor 56 that is operable to detect an ambient air temperature within the cabin 26 of the vehicle 12.

In some embodiments, the sensing system 48 may be operable to sense sunlight. It is contemplated that one or more of a variety of types of sensors 50 of the sensing system 48 may be utilized to sense sunlight. For example, in some embodiments, the sensing system 48 may include an optical sensor 58 configured to sense sunlight by converting optical energy introduced to the optical sensor 58 into an electric signal. The optical sensor 58 may absorb optical energy and sense sunlight using photoelectric effects that refer to discharge of electrons caused by absorption of optical energy. The optical sensor 58 may transmit the converted electric signal to the controller 20 of the sensing system 48, which may calculate the quantity of light based on the electric signal converted from the sensed sunlight. In some implementations, the sensing system 48 may be operable to sense how much light is entering the cabin 26 and/or a portion of the cabin 26. It is contemplated that, in various embodiments, the controller 20 may make a determination as to how much and/or at what locations sunlight is entering the vehicle 12 based on the sensing system 48 sensing one or more effects associated with sunlight. For example, the controller 20 may determine that sunlight is entering a portion of the cabin 26 based on image data received from at least one imager 52 of the vehicle 12 that reveals an illuminated portion of the vehicle 12 adjacent to a shaded portion of the vehicle 12. Various methods of sensing sunlight and/or determining the presence of sunlight are contemplated.

Referring now to FIG. 2, the system 10 may include and/or be in communication with the controller 20. The controller 20 may be configured with a microprocessor 60 to process logic and routines stored in memory 62. The controller 20 may receive information from the above-described devices and systems, including the sensing system 48, the HMI 42, the one or more actuators 40, and/or various other vehicle sensors 50 and devices. The controller 20 may generate commands to control operation of various components of the vehicle 12 and/or devices incorporated in the system 10 of the vehicle 12, such as the air conditioning system 14 and the control feature 16 as a function of all or a portion of the information received. The controller 20 may include the microprocessor 60 and/or other analog and/or digital circuitry for processing one or more routines. Further, the controller 20 may include the memory 62 for storing one or more routines.

It should be appreciated that the controller 20 may be a stand-alone dedicated controller 20 or may be a shared controller 20 integrated with other control functions, such as integrated with the sensing system 48, the air conditioning system 14, the control feature 16, the HMI 42, and/or other conceivable onboard or off-board vehicle control systems. It should further be appreciated that certain functions may be carried out by a dedicated processor. For example, image processing may be carried out by a dedicated processor, and the results of the image processing may be output to other components and systems of vehicle 12, including the microprocessor 60.

Referring still to FIG. 2, in some embodiments, the sensing system 48 may sense at least one characteristic of a user positioned within the cabin 26 or in an exterior environment of the vehicle 12, and the controller 20 may make one or more determinations based on the at least one sensed characteristic of the user, such as an identity of the user, a type of clothing worn by the user, a temperature of the user, a respiration rate of the user, or physical appearance of the user. The controller 20 may be operable to prompt various vehicle actions based on the determinations. In various embodiments, the controller 20 is configured to control operation of the air conditioning system 14 and/or the control feature 16 based on the determinations. For example, the controller 20 may control the air conditioning system 14 and the control feature 16 to operate in accordance with an operating routine associated with a user profile stored in memory 62 based on a determination of an identity of a user entering the vehicle 12 matching the identity associated with the user profile. Further, the controller 20 may control the air conditioning system 14 to convey warmed air 24 into the cabin 26, and the control feature 16 to control the flow of the warmed air 24 directly onto a steering wheel of the vehicle 12 based on a determination that a user entering a driver side of the vehicle 12 is wearing gloves. Various implementations are contemplated.

In some embodiments, the sensing system 48 may sense and/or the controller 20 may determine at least one vehicle 12 and/or environmental condition, and the controller 20 may prompt various vehicle actions based on the determinations. In various embodiments, the controller 20 is configured to control operation of the air conditioning system 14 and/or the control feature 16 based on the at least one vehicle 12 and/or environmental condition being sensed and/or determined. For example, the controller 20 may control the air conditioning system 14 to deliver conditioned air 24 into the cabin 26 and the control feature 16 to control the direction that conditioned air 24 is delivered into the cabin 26 based on the sensing system 48 sensing and/or the controller 20 determining one or more of a host of vehicle and/or environmental conditions that may include, but is not limited to, ambient air temperature within the cabin 26, ambient air temperature in the exterior environment of the vehicle 12, sunlight shining on the vehicle 12, movement of the vehicle 12, the presence or absence of one or more users within and/or proximate to the vehicle 12, the identity of one or more users within or proximate to the vehicle 12, characteristics of a user of the vehicle 12, and/or a combination thereof. In an exemplary embodiment, the controller 20 is configured to control the air conditioning system 14 to deliver cooled air 24 into the cabin 26 and control the control feature 16 to direct the cooled air 24 onto a portion of a user of the vehicle 12 based on the sensing system 48 sensing that sunlight is shining onto said portion of the user.

In various implementations, the controller 20 may control the air conditioning system 14 and/or the control feature 16 in response to receiving an input from the input device 44 of the system 10. For example, the controller 20 may control air flow rate, conditioned air 24 temperature, air flow direction, and/or a combination thereof based on one or more inputs received from the input device 44. Further, the controller 20 may control the air conditioning system 14 and/or the control feature 16 to operate in accordance with predetermined operating parameters associated with standard or custom use modes of the system 10, as described further herein.

Referring now to FIGS. 2 and 4-6, in various implementations, the display 18 of the HMI 42 is operable to display an air flow graphic 28 that represents the flow of conditioned air 24 into the cabin 26 of the vehicle 12. The air flow graphic 28 includes a directional quality. In various implementations, the directional quality of the air flow graphic 28 corresponds with the orientation of the control feature 16, such that the directional quality of the air flow graphic 28 corresponds with the direction of the conditioned air 24 flowing into the cabin 26, as influenced by the control feature 16. In some implementations, the display 18 of HMI 42 displays a vehicle interior graphic 64 and the air flow graphic 28. For example, in the embodiment illustrated in FIGS. 4-6, the display 18 displays the vehicle interior graphic 64 that depicts a vehicle-forward end of the cabin 26 of the vehicle 12 including the instrument panel 32, a steering wheel, a plurality of outlets 36, and portions of seating assemblies within the cabin 26. In the illustrated embodiment, a plurality of air flow graphics 28 extends into the cabin 26 from the outlets 36. Each includes a directional quality that indicates to a viewer a direction of the conditioned air 24 flowing from the outlet 36 to a distal end 66 of the air flow graphic 28. For example, in the implementation of the display 18 illustrated in FIG. 4, the directional quality of the rightward-most air flow graphic 28 (from the perspective of a viewer of FIG. 4) indicates the flow of conditioned air 24 from the corresponding outlet 36 in a vehicle-laterally-outboard and vehicle-laterally-downward direction. In the implementation of the display 18 illustrated in FIG. 6, the directional quality of the rightward-most air flow graphic 28 (from the perspective of a viewer of FIG. 6) indicates the flow of conditioned air 24 from the corresponding outlet 36 in a vehicle-laterally-inboard direction and a vehicle-upward direction. In some embodiments, the air flow graphics 28 have a magnitude quality that corresponds with a magnitude and/or rate of air flow from the outlet 36. For example, when the magnitude and/or rate of conditioned air 24 flowing out of an outlet 36 is relative high, a distal end 66 of an air flow graphic 28 may be further from the corresponding outlet 36 than when the magnitude and/or rate of conditioned air 24 flowing from the outlet 36 is relative low.

Referring still to FIGS. 2 and 4-6, in some implementations, wherein the display 18 is the touchscreen 46, the touchscreen 46 may display a plurality of input options for controlling the air conditioning system 14 and/or the control feature 16. The display 18 may include an input option represented by an air flow control icon 68 that can be dragged along the display 18 via a touch event by a user to control the direction that conditioned air 24 flows into the cabin 26 (via the controller 20 responsively prompting actuation of the control feature 16) and/or the magnitude and/or rate of the conditioned air 24 flowing into the cabin 26 (via the controller 20 responsively prompting the air conditioning system 14). In the embodiment illustrated in FIGS. 4-6, the display 18 displays a plurality of air flow control icons 68 that correspond with and are positioned proximate to the distal ends 66 of the respective air flow graphics 28. It is contemplated that the touchscreen 46 may include a plurality of visually represented input options for controlling operation of various aspects of the air conditioning system 14 and/or the control feature 16, in various embodiments.

Referring now to FIGS. 2-7, the controller 20 of the system 10 of the vehicle 12 may be configured to initiate a variable air flow routine 22. In an exemplary embodiment of the system 10, initiation of the variable air flow routine 22 by the controller 20 may prompt a step 200 of executing a predetermined actuation sequence of the control feature 16 such that the direction of conditioned air 24 flowing from the air conditioning system 14 into the cabin 26 of the vehicle 12 is varied sequentially by the motorized directional air flow control feature 16. In some implementations, the predetermined actuation sequence is executed for a predetermined duration. For example, in some implementations, the predetermined duration is greater than 10 seconds. In some implementations, the predetermined duration is greater than 30 seconds. In some implementations, execution of the predetermined actuation sequence includes actuating the motorized directional air flow control feature 16, such that the direction of conditioned air 24 flowing into the cabin 26 is modified in a first direction having a first vehicle-direction component, and subsequently actuating the motorized directional air flow control feature 16, such that the direction of conditioned air 24 flowing into the cabin 26 is modified in a second direction having a second vehicle-direction component that is opposite the first vehicle-direction component. In an exemplary implementation, the first vehicle-direction component is a first vehicle-lateral direction, and the second vehicle-direction component is a second vehicle-lateral direction that is opposite the first vehicle-lateral direction. In some implementations, the first vehicle-direction component is vehicle-upward and the second vehicle-direction component is vehicle-downward. In various implementations, the step 200 of executing the predetermined actuation sequence of the control feature 16 may cause the control feature 16 to oscillate repeatedly or follow a cyclical movement pattern.

The variable air flow routine 22 may proceed to step 202 of displaying on the display 18 an air flow graphic 28 having a directional quality that corresponds with the orientation of the motorized directional air flow control feature 16, such that the directional quality of the air flow graphic 28 varies sequentially with the direction of the conditioned air 24 flowing from the air conditioning system 14. In various implementations, the step 200 and the step 202 may be performed concurrently. For example, in some implementations, the air flow graphic 28 having the directional quality that corresponds with the orientation of the control feature 16 may be displayed within 150 milliseconds of the execution of the predetermined actuation sequence of the control feature 16. In other words, as the control feature 16 is actuated, to change the orientation of the control feature 16, the display 18 may display corresponding movement of the directional quality of the air flow graphic 28 within 150 milliseconds.

Figure 7:
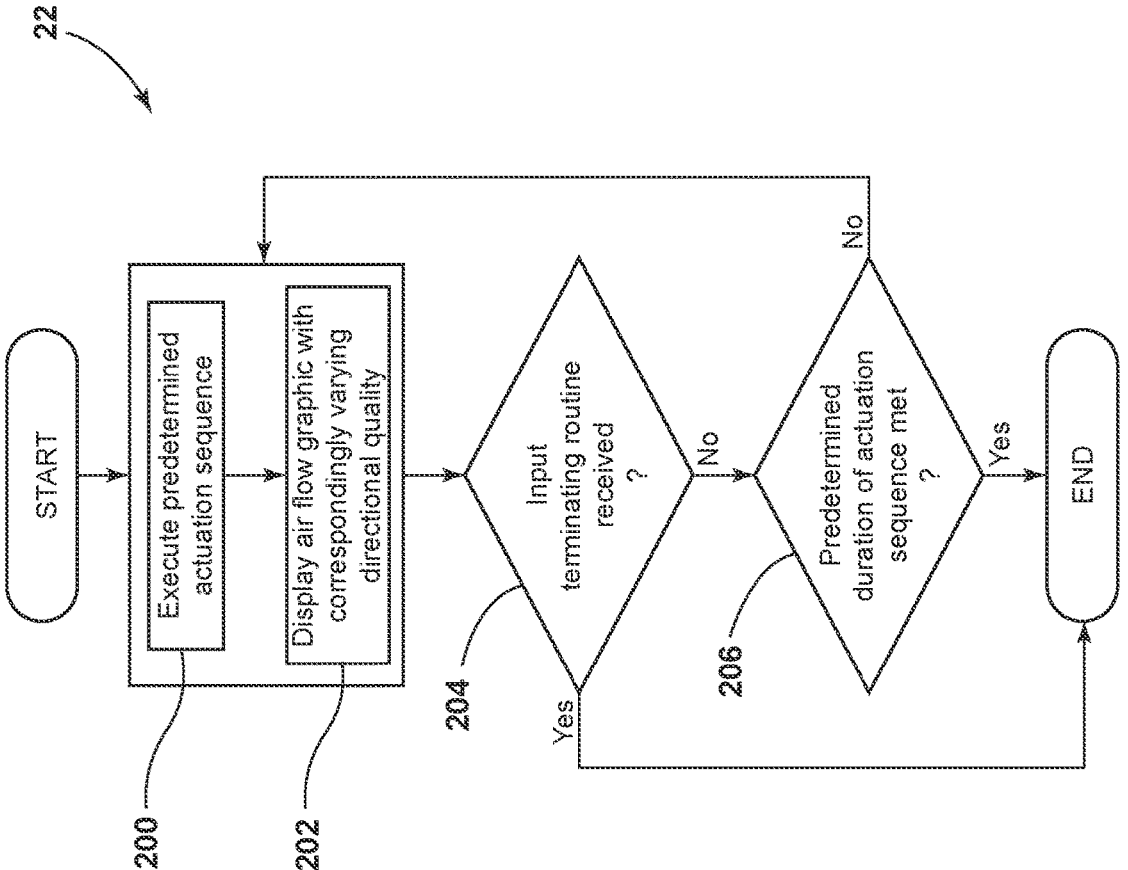
FIG. 7 is a flow diagram of a variable air flow routine of a system of a vehicle, according to one embodiment.

Next, the variable air flow routine 22 may proceed to step 204 of determining whether a user input has been received via the input device 44 to terminate the variable air flow routine 22. In an exemplary embodiment, a user may select a default operating mode via a user input selection on the touchscreen 46 HMI 42 of the system 10 of the vehicle 12 that terminates the variable air flow routine 22. If the controller 20 determines that a user input has been received that terminates the variable air flow routine 22, the variable air flow routine 22 ends, as illustrated in FIG. 7. If a routine-terminating input is not received, the variable air flow routine 22 proceeds to step 206.

At step 206, the controller 20 determines whether a predetermined duration of the variable air flow routine 22 has been met. In some implementations, the predetermined duration may be greater than 10 seconds. In some implementations, the predetermined duration may be greater than 30 seconds. If the controller 20 determines that the predetermined duration of the variable air flow routine 22 has not been met, the variable air flow routine 22 continues with the concurrent execution of steps 200 and 202. If the controller 20 determines that the predetermined duration of the variable air flow routine 22 has been met, the variable air flow routine 22 ends. In various implementations, the controller 20 may initiate the variable air flow routine 22 in response to the input device 44 of the system 10 receiving a user input. For example, the controller 20 may initiate the variable air flow routine 22 in response to a touch event by a user on a touchscreen 46 utilized in the system 10. It is contemplated that the variable air flow routine 22 may be initiated based on a variety of inputs to the controller 20.

Figure 8:
FIG. 8 is a block diagram illustrating a method of operating a system of a vehicle, according to one embodiment.
Figure 8:
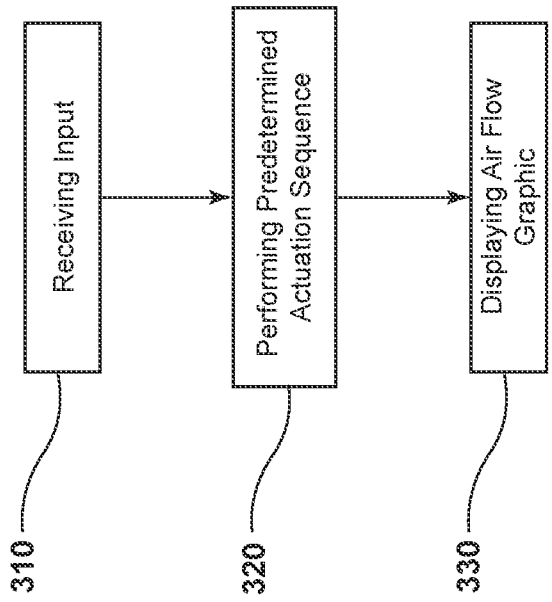

Referring now to FIG. 8, a method 300 of operating a system 10 of the vehicle 12 includes the step 310 of receiving a user input via an input device 44. In some implementations, the input device 44 is the touchscreen 46 that includes the display 18 of the system 10.

The method 300 may include the step 320 of performing a predetermined actuation sequence of the motorized directional air flow control feature 16 of the vehicle 12, such that a direction of conditioned air 24 flowing from the air conditioning system 14 into the cabin 26 of the vehicle 12 is varied sequentially by the motorized directional air flow control feature 16. In some implementations, the step 320 of performing the predetermined actuation sequence comprises actuating the motorized directional air flow control feature 16, such that the direction of conditioned air 24 flowing into the cabin 26 is modified in a first direction having a first vehicle-direction component, and subsequently actuating the motorized directional air flow control feature 16, such that the direction of conditioned air 24 flowing into the cabin 26 is modified in a second direction having a second vehicle-direction component that is opposite the first vehicle-direction component. In some implementations, the first vehicle-direction component is a first vehicle-lateral direction, and the second vehicle-lateral direction component is a second vehicle-lateral direction that is opposite the first vehicle-lateral direction. In some implementations, the first vehicle-direction component is vehicle-upward and the second vehicle-direction component is vehicle-downward.

The method 300 may further include the step 330 of displaying on the display 18 of the system 10 an air flow graphic 28 that includes a directional quality that varies sequentially to correspond with the sequentially varying direction of the conditioned air 24 flowing from the air conditioning system 14 into the cabin 26.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A system for a vehicle, comprising:
an air conditioning system;
a sensing system including an imager that provides image data of a cabin of the vehicle;
a motorized directional air flow control feature including:
an actuator; and
a flow influencing feature;
a display; and
a controller configured to determine, from the image data, a portion of a user shined-on by sunlight, and further configured to initiate a variable air flow routine responsive to the shined-on portion, wherein initiation of the variable air flow routine prompts:
execution of a predetermined actuation sequence of the motorized directional air flow control feature such that the direction of conditioned air flowing from the air conditioning system into a cabin of the vehicle is varied sequentially by the actuator and flow influencing feature of the motorized directional air flow control feature; and
the display to display an air flow graphic having a directional quality that corresponds with the orientation of the motorized directional air flow control feature such that the directional quality of the air flow graphic varies sequentially with the direction of the conditioned air flowing from the air conditioning system,
wherein the controller is configured to determine, from the image data, a portion of a user shined-on by sunlight using an image-processing routine that includes information related to the position of the imager relative to the vehicle, wherein the information related to the position of the imager relative to the vehicle is relative to a center of the vehicle.

2. The system of claim 1, wherein initiation of the variable air flow routine prompts execution of the predetermined actuation sequence for a predetermined duration.

3. The system of claim 2, wherein the predetermined duration is greater than 10 seconds.

4. The system of claim 3, wherein the predetermined duration is greater than 30 seconds.

5. The system of claim 1, wherein execution of the predetermined actuation sequence includes actuating the motorized directional air flow control feature, such that the direction of conditioned air flowing into the cabin is modified in a first direction having a first vehicle-direction component, and subsequently actuating the motorized directional air flow control feature, such that the direction of conditioned air flowing into the cabin is modified in a second direction having a second vehicle-direction component that is opposite the first vehicle-direction component.

6. The system of claim 5, wherein the first vehicle-direction component is a first vehicle-lateral direction, and the second vehicle-direction component is a second vehicle-lateral direction that is opposite the first vehicle-lateral direction.

7. The system of claim 5, wherein the first vehicle-direction component is vehicle-upward and the second vehicle-direction component is vehicle-downward.

8. The system of claim 1, wherein the display is a touchscreen display, and wherein the controller is further configured to terminate the predetermined actuation sequence in response to input received via the touchscreen display.

9. The system of claim 1, wherein executing the predetermined actuation sequence also directs conditioned air to the shined-on portion.

10. A method of operating a system of a vehicle, comprising the steps of:
capturing image data of a cabin of the vehicle, the image data including a portion of a user shined-on by sunlight;
performing, responsive to the shined-on portion, a predetermined actuation sequence of a motorized directional air flow control feature of the vehicle, such that a direction of conditioned air flowing from an air conditioning system into a cabin of the vehicle is varied sequentially by an actuator and a flow influencing feature of the motorized directional air flow control feature, wherein performing the predetermined actuation sequence comprises executing an image-processing routine that includes information related to the position of an imager relative to the vehicle;

displaying on a touchscreen display an air flow graphic that includes a directional quality that varies sequentially to correspond with the sequentially varying direction of the conditioned air flowing from the air conditioning system into the cabin; and terminating the predetermined actuation sequence in response to input received via the touchscreen display, wherein performing the predetermined actuation sequence also directs conditioned air to the shined-on portion, wherein the information related to the position of an imager relative to the vehicle is relative to a center of the vehicle.

11. The method of claim 10, wherein the step of performing a predetermined actuation sequence comprises:

actuating the motorized directional air flow control feature, such that the direction of conditioned air flowing into the cabin is modified in a first direction having a first vehicle-direction component; and subsequently actuating the motorized directional air flow control feature, such that the direction of conditioned air flowing into the cabin is modified in a second direction having a second vehicle-direction component that is opposite the first vehicle-direction component.

12. The method of claim 11, wherein the first vehicle-direction component is a first vehicle-lateral direction, and the second vehicle-direction component is a second vehicle-lateral direction that is opposite the first vehicle-lateral direction.

13. The method of claim 11, wherein the first vehicle-direction component is vehicle-upward and the second vehicle-direction component is vehicle-downward.

\* \* \* \* \*